(12) United States Patent
Matsumoto et al.

(10) Patent No.: US 6,895,647 B2
(45) Date of Patent: May 24, 2005

(54) DEVICE AND METHOD FOR MOUNTING PART TO BASE STRUCTURE

(75) Inventors: Masashi Matsumoto, Kanagawa (JP); Makoto Sasahara, Tochigi (JP); Takamitsu Ono, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 225 days.

(21) Appl. No.: 10/163,421

(22) Filed: Jun. 7, 2002

(65) Prior Publication Data

US 2003/0019090 A1 Jan. 30, 2003

(30) Foreign Application Priority Data

Jul. 25, 2001 (JP) ........................................ 2001-224921

(51) Int. Cl.[7] ............................................. B25B 27/14
(52) U.S. Cl. ........................ 29/281.4; 29/468; 269/51; 269/58
(58) Field of Search .............................. 29/897.2, 464, 29/466, 468, 423, 469, 281.1, 281.4, 407.09, 407.1, 783, 791; 296/193.04; 269/50, 51, 58

(56) References Cited

U.S. PATENT DOCUMENTS

| | | | |
|---|---|---|---|
| 4,779,336 A | | 10/1988 | Inoue et al. |
| 4,969,249 A | * | 11/1990 | Yamamoto et al. ........ 29/281.4 |
| 5,123,695 A | * | 6/1992 | Kanemitsu et al. .... 296/193.09 |
| 5,456,002 A | * | 10/1995 | Barnhart et al. .............. 29/787 |
| 5,477,603 A | * | 12/1995 | Kemichick .................. 29/468 |
| 6,061,890 A | * | 5/2000 | Shashlo et al. ............... 29/464 |
| 6,122,813 A | * | 9/2000 | Roy et al. ................. 29/407.09 |
| 6,205,638 B1 | * | 3/2001 | Yustick ......................... 29/464 |
| 6,367,141 B1 | * | 4/2002 | Cook et al. ................. 29/407.1 |
| 6,375,252 B1 | * | 4/2002 | Cheron et al. ......... 296/203.02 |
| 6,481,077 B1 | * | 11/2002 | Matsumoto et al. .......... 29/468 |
| 6,691,392 B2 | * | 2/2004 | Savoy et al. ............. 29/407.09 |
| 6,708,393 B1 | * | 3/2004 | Roy et al. .................. 29/281.1 |
| 6,711,800 B2 | * | 3/2004 | Savoy ......................... 29/468 |

FOREIGN PATENT DOCUMENTS

| | | |
|---|---|---|
| EP | 0 437 781 A2 | 7/1991 |
| FR | 2 786 152 A1 | 5/2000 |
| JP | 3-227781 | 10/1991 |
| JP | 7-069244 | 3/1995 |

\* cited by examiner

*Primary Examiner*—David P. Bryant
(74) *Attorney, Agent, or Firm*—Foley & Lardner LLP

(57) ABSTRACT

A part mounting device is provided for mounting a front end module onto a vehicle body. The device comprises a frame structure vertically movably mounted on a carry truck through a lifter, a holding device capable of holding the front end module onto the frame structure, a positioning bar slidably disposed on the frame structure, and an actuator capable of moving the positioning bar on the frame structure. Positioning pins are movably held on both ends of the positioning bar and engageable with positioning openings formed in a front end of the vehicle body. When the positioning pins are brought into engagement with the positioning openings, the frame structure is moved to a position to establish a positioning of the front end module relative to the vehicle body, and when then the actuator moves the positioning bar in a given direction, the front end module is moved toward the front end of the vehicle body together with the frame structure keeping the positioning of the front end module relative to the vehicle body.

11 Claims, 15 Drawing Sheets

DEVICE AND METHOD FOR MOUNTING PART TO BASE STRUCTURE

BACKGROUND OF INVENTION

1. Field of Invention

The present invention relates to a device and a method for mounting a part to a base structure, and more particularly to a device and a method for mounting an automotive part to a given position of a vehicle body. More specifically, the present invention is concerned with a device and a method for mounting an automotive module onto a given portion of an automotive body.

2. Description of Related Art

In order to clarify the task of the present invention, related art of the invention will be briefly described with reference to FIG. 15 of the accompanying drawings.

FIG. 15 shows a part mounting device 2 shown in Laid-Open Japanese Patent Application 3-227781, which is constructed to facilitate the work for mounting a front end module 3 to a front end of a vehicle body 1. The part mounting device 2 has a part mounting jig 5 which is held on a carry truck 15 through a lifter 4. Front end module 3 shown in the drawing includes a radiator core support 7, a bumper 9, a radiator 11 and a condenser 13 which are semi-assembled. Part mounting jig 5 is shaped to surround almost entire construction of front end module 3. As may be understood from the drawing, positioning and setting of front end module 3 relative to part mounting jig 5 is achieved by engaging upper and lower holding pins with positioning openings formed in front end module 3.

For mounting front end module 3 onto the front end of vehicle body 1, carry truck 15 is brought closely to the front end of vehicle body 1, and front end module 3 is fixed to a given portion of the front end of vehicle body 1 by bolts or the like.

A similar part mounting device is shown in Laid-Open Japanese Patent Application 7-69244.

SUMMARY OF INVENTION

Applicants have found however that the above-mentioned part mounting devices are not suitable for mounting a certain type of front end module to the front end of vehicle body 1, such as one having further right and left head lamps that are to be mounted to right and left front fenders 1a of vehicle body 1. That is, because of inevitable appearance of dimensional errors of front fenders 1a, it is considerably difficult to establish a precise or proper positioning between the head lamps on the front end module and front fenders 1a of vehicle body. If the positioning of them is made poor, precise mounting of the front end module to the vehicle body is not carried out with ease.

Accordingly, it is an object of the present invention to provide a device and a method for mounting a shaped part onto a given portion of a base structure, which bring about an easy and precise mounting of the shaped part onto the base structure.

More specifically, the object of the present invention is to provide a device and a method for mounting a front end module onto a front end of a vehicle body, which bring about an easy and precise mounting of the front end module onto the vehicle body.

According to a first aspect of the present invention, there is provided a device for mounting a shaped part onto a given portion of a base structure, which comprises a first structure which is movable relative to the base structure and has a holding device which is capable of holding the shaped part when operated; a second structure which is slidably disposed on the first structure and has a positioning device which is capable of establishing a positioning of the first structure relative to the base structure when operated; and a position adjusting mechanism incorporated with the positioning device and capable of establishing a positioning of the shaped part held by the holding device relative to the base structure when the holding device and the positioning device are both operated, wherein when, with the position adjusting mechanism establishing the positioning of the shaped part relative to the base structure, the second structure is slid on the first structure in a given direction, the first structure is moved toward the positioning device while carrying the shaped part by the holding device to a given position of the base structure.

According to a second aspect of the present invention, there is provided a method for mounting a shaped part onto a given portion of a base structure, which comprises holding the shaped part on a jig; positioning the jig relative to the given portion of the base structure; positioning the shaped part held by the jig relative to the given portion of the base structure; moving the jig relative to the given portion to bring the shaped part held by the jig to the given portion of the base structure; and fixing the shaped part to the given portion of the base structure.

According to a third aspect of the present invention, there is provided a method for mounting a front end module onto a front end of a vehicle body, which comprises holding the front end module on a jig; positioning the jig relative to the front end of the vehicle body; positioning the front end module held by the jig relative to the front end of the vehicle body; moving the jig relative to the front end of the vehicle body to bring the front end module held by the jig to the front end of the vehicle body; and fixing the front end module to the front end of the vehicle body.

According to a fourth aspect of the present invention, there is provided a device for mounting a front end module onto a front end of a vehicle body, which comprises a frame structure that is vertically movably mounted on a carry truck through a lifter; a holding device that holds the front end module on the frame structure; a positioning bar slidably disposed on the frame structure; an actuator that moves the positioning bar on the frame structure when operated; positioning pins movably held on both ends of the positioning bar, the positioning pins being engageable with positioning openings formed in the front end of the vehicle body; and a link mechanism that varies a distance between the positioning pins when operated.

DETAILED DESCRIPTION OF INVENTION

In the following, the present invention will be described in detail with reference to the accompanying drawings.

For ease of understanding, the following description will be made with the aid of various directional expressions, such as, in the directions of X, Y and Z. It is however to be noted that the directions of X, Y and Z indicate the lateral, fore-and-aft and up-and-down directions with respect to a vehicle body 19 (see FIG. 12) with which the present invention is associated.

Figure 1:
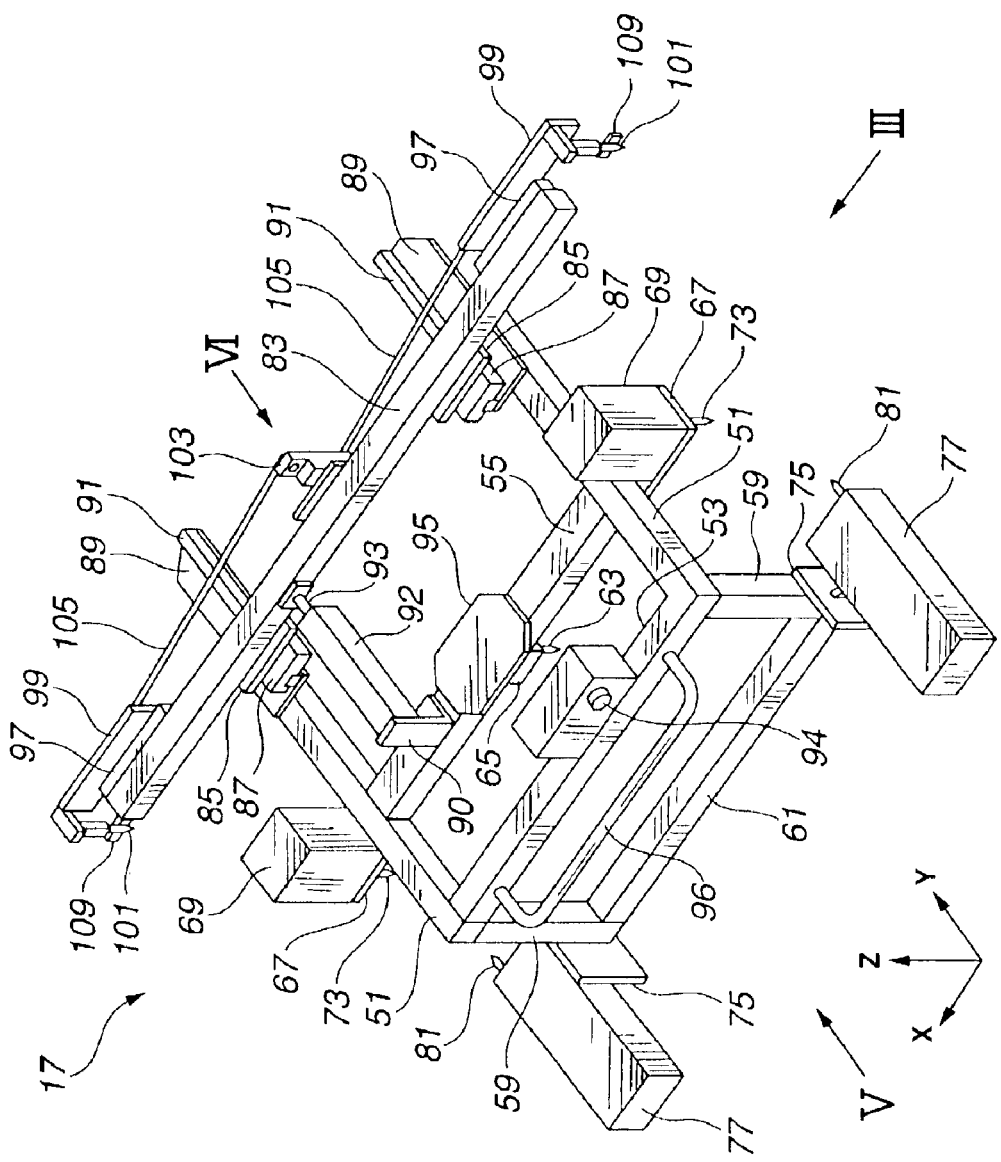
FIG. 1 is a perspective view of an essential portion of a part mounting device of the present invention, which is a part mounting jig.
Figure 15:
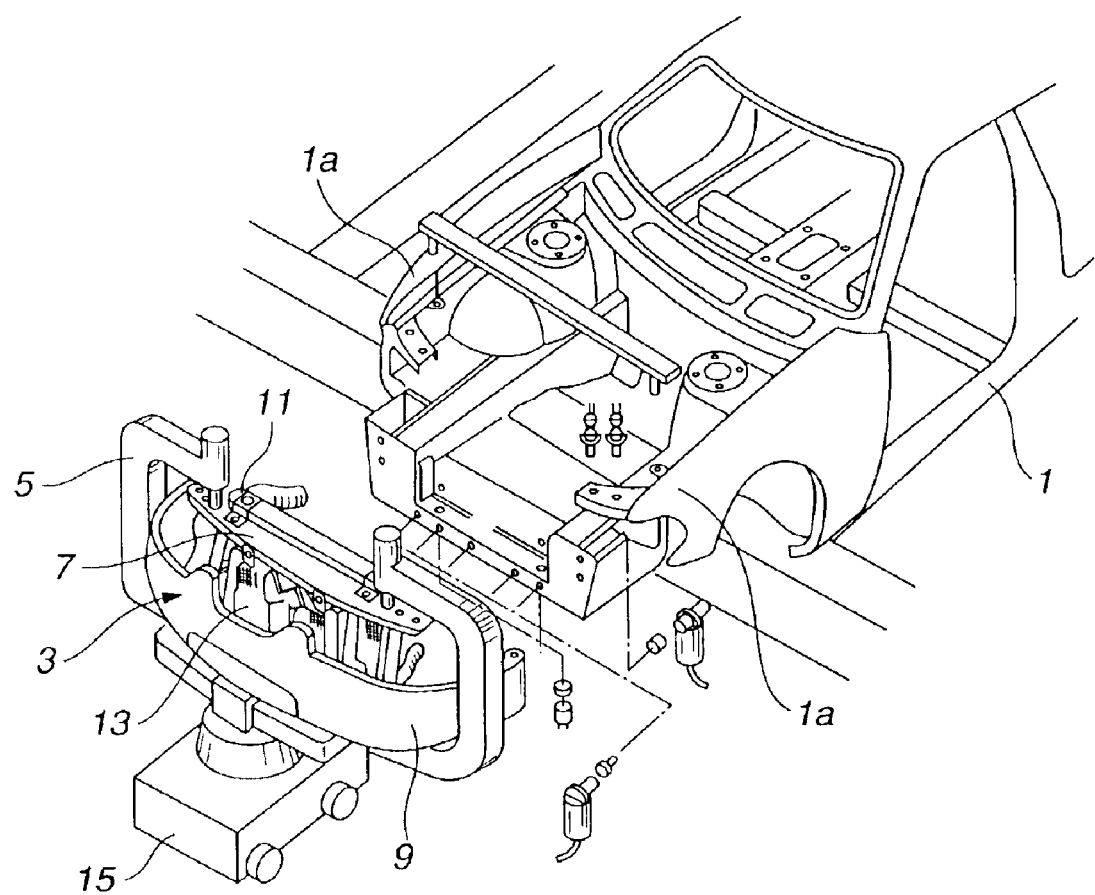
FIG. 15 is a perspective view of a part mounting device of related art.

Referring to FIG. 1, there is shown a part mounting jig 17 which constitutes an essential part of a part mounting device of the present invention. As will be described in detail hereinafter, part mounting jig 17 is mounted on a lifter disposed on a carry truck (15), like in the case of the above-mentioned related art of FIG. 15.

Figure 12:
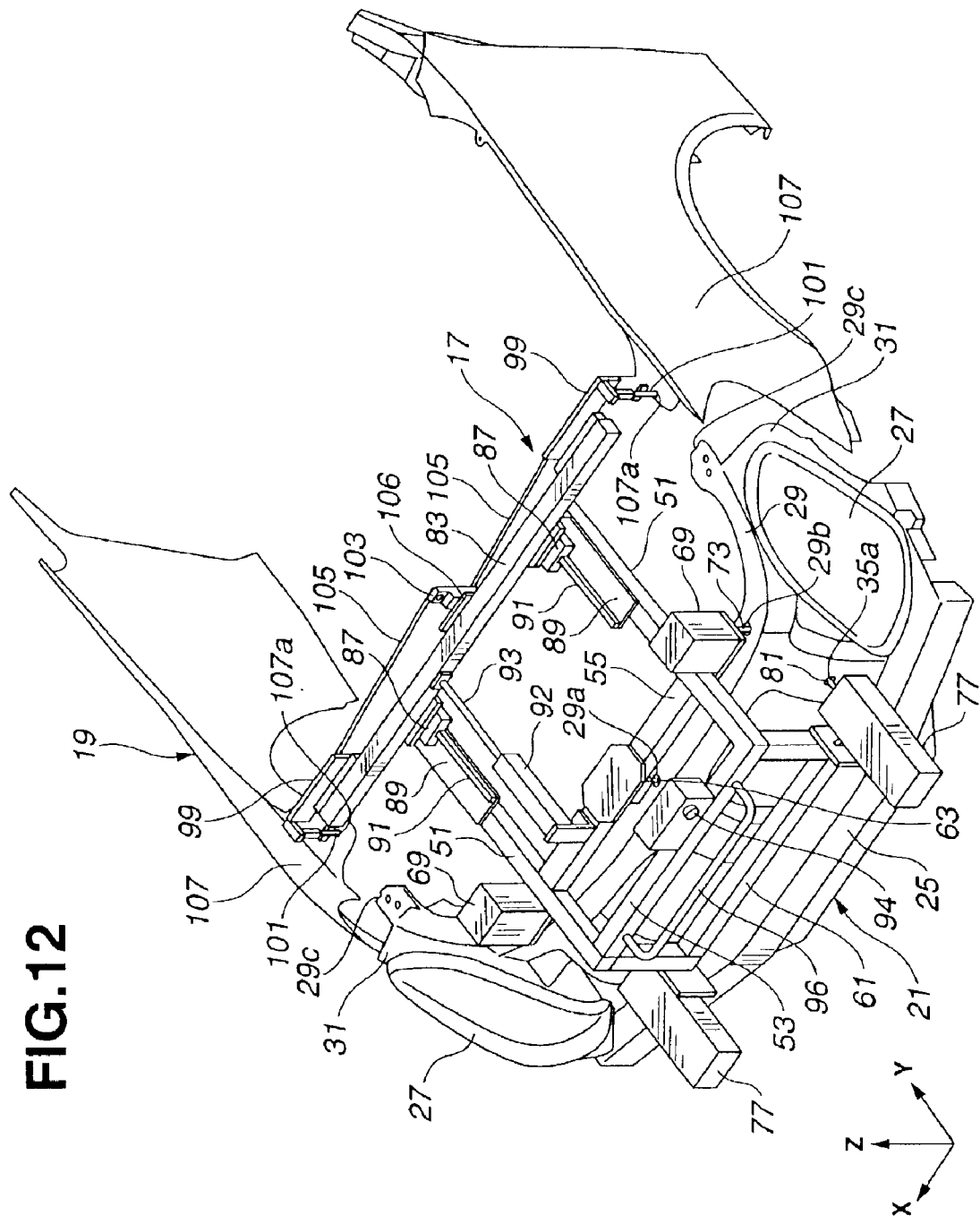
FIG. 12 is a perspective view of a front portion of the vehicle body under a condition wherein the front end module is about to be mounted to the front portion of the vehicle body.

Part mounting jig 17 is constructed to temporarily support a front end module (FEM) 21 (see FIG. 2) which is to be mounted to a front end of a vehicle body 19 (see FIG. 12).

Figure 2:
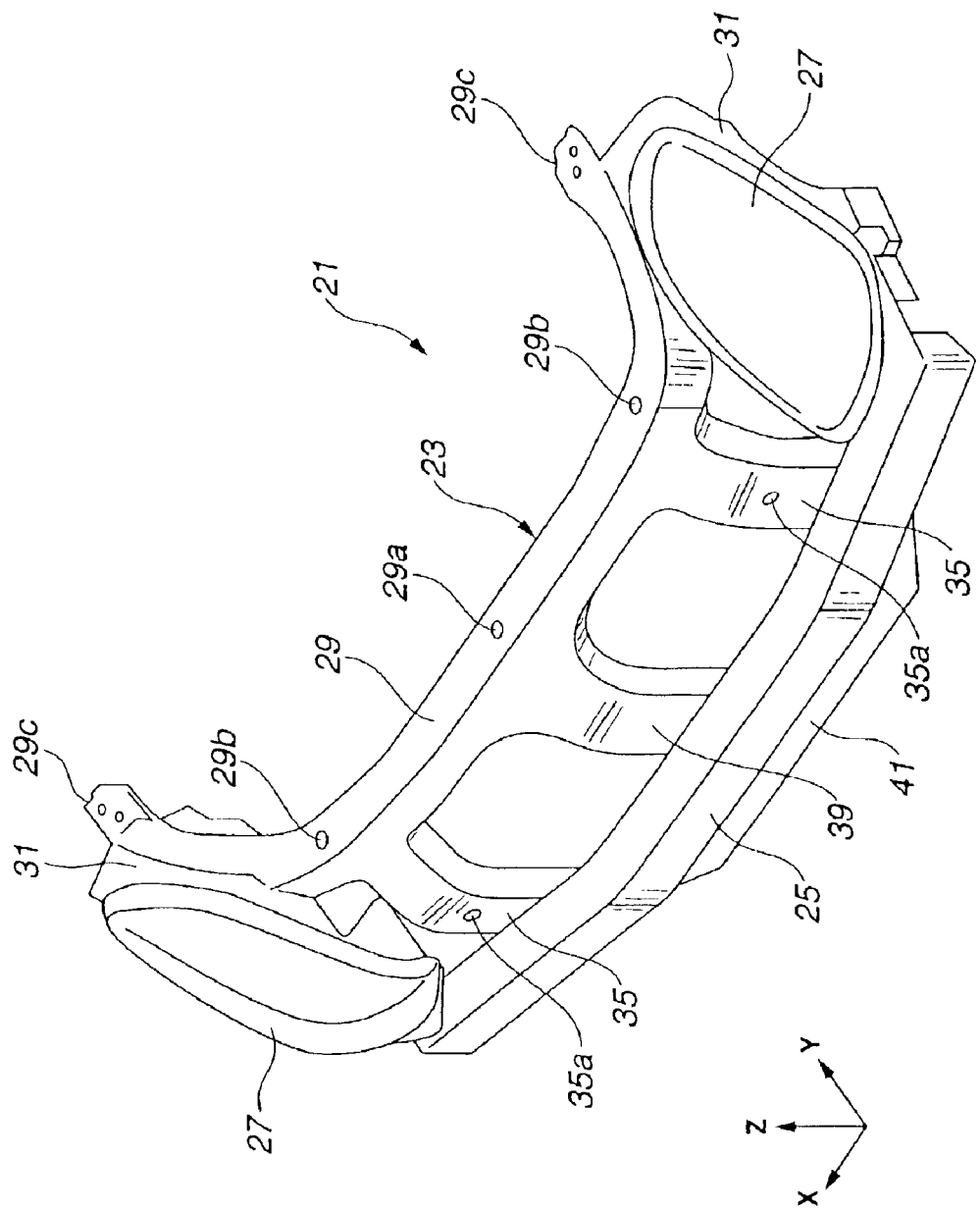
FIG. 2 is a perspective view of a front end module which is to be mounted to a front end of a vehicle body by means of the part mounting jig of FIG. 1.

As is seen from FIG. 2, front end module 21 comprises a plastic radiator core support 23 serving as a structural base of the module 21, a bumper reinforcing member 25, right and left head lamps 27, a radiator core (not shown) of an engine cooling system and a condenser (not shown) of an automotive air conditioner. Right and left head lamps 27 are snugly received in head lamp receiving portions 31 of radiator core support 23. Front end module 21 shown is about 40 Kg in weight.

Front end module 21 may further comprise an inter-cooler and an air duct connected to the inter-cooler, when an engine mounted on vehicle body 19 is of a turbo-charger type. The entire structure or shape of front end module 21 varies depending on types of the vehicle because the shape and size of radiator core support 23, head lamps 27 and the other parts vary depending on the types of the vehicle.

As is seen from FIG. 2, radiator core support 23 comprises a laterally extending radiator core upper member 29 which has at lateral ends thereof head lamp receiving portions 31, each projecting downward.

Radiator core upper member 29 has at its middle and two side portions positioning openings 29a, 29b and 29b for the purpose that will become apparent hereinafter. Furthermore, radiator core upper member 29 is formed at lateral ends thereof with positional reference recesses 29c.

Figure 11:
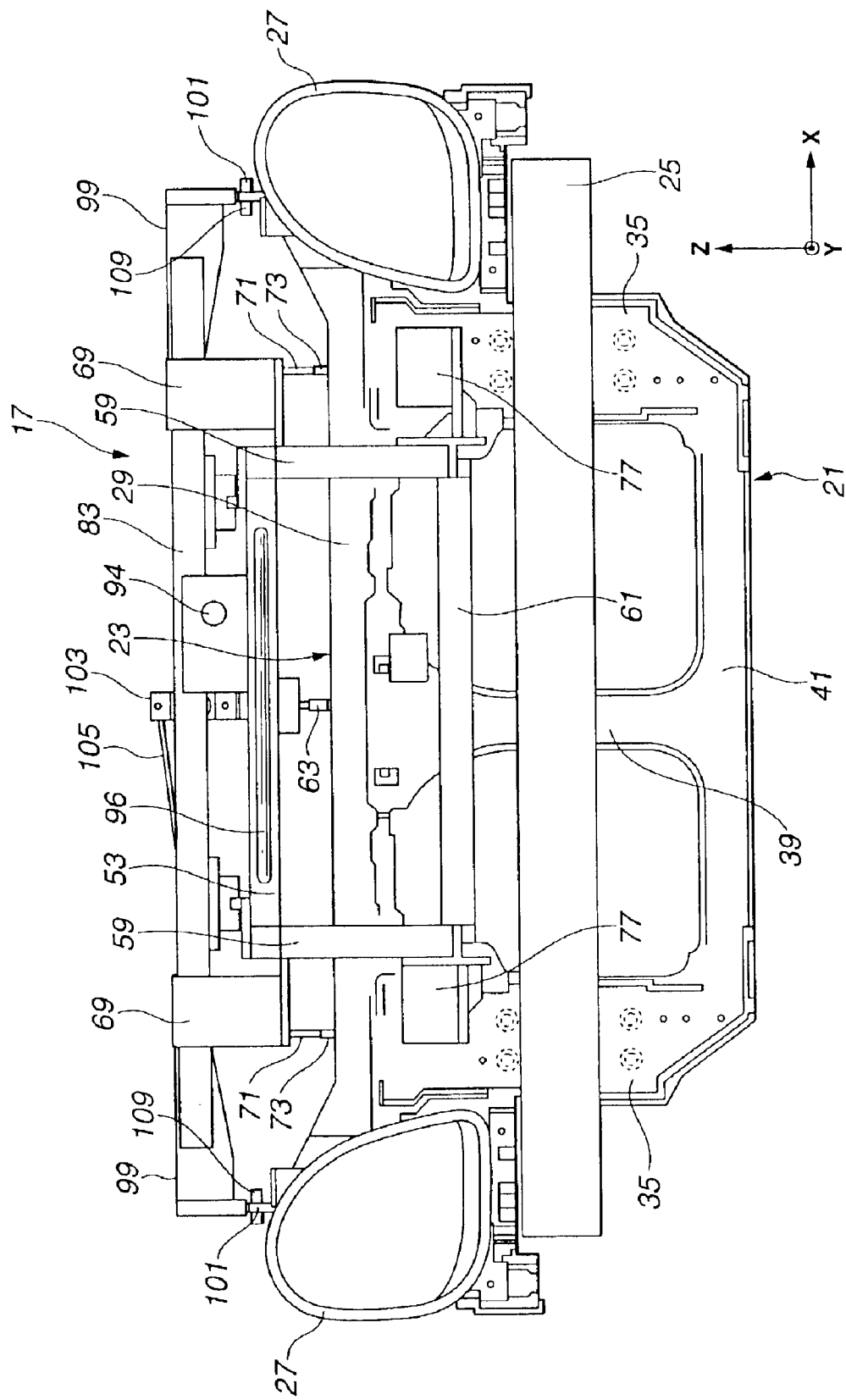
FIG. 11 is a view taken from the direction of the arrow "XI" of FIG. 8.

Radiator core upper member 29 has further three downwardly extending pillar portions 35, 39 and 35 whose lower ends are integrally connected to a laterally extending radiator core lower member 41 (see FIG. 11). As shown in FIG. 2, two 35 of the pillar portions 35, 39 and 35 are located near the laterally inside sections of head lamp receiving portions 31 respectively, and the remaining one 39 of the pillar portions 35, 39 and 35 is located at the middle between the head lamp receiving portions 31. The two side pillar portions 35 are formed with positioning openings 35a respectively, for the purpose which will become apparent hereinafter.

As is seen from FIGS. 2 and 11, bumper reinforcing member 25 is secured to front surfaces of the three pillar portions 35, 39 and 35 and extend laterally. Although not shown in these drawings, a bumper proper is mounted on bumper reinforcing member 25 after front end module 21 is mounted onto the front end of vehicle body 12.

Referring back to FIG. 1, part mounting jig 17 comprises two mutually spaced horizontal side frames 51 which extend in the direction of Y. A front upper frame 53 extending in the direction of X is connected at lateral ends thereof to front ends of horizontal side frames 51. A center frame 55 extends between middle portions of horizontal side frames 51. Two pillar frames 59 extend downward from the front ends of horizontal side frames 51. A front lower frame 61 extends between lower ends of respective pillar frames 59.

Figure 5:
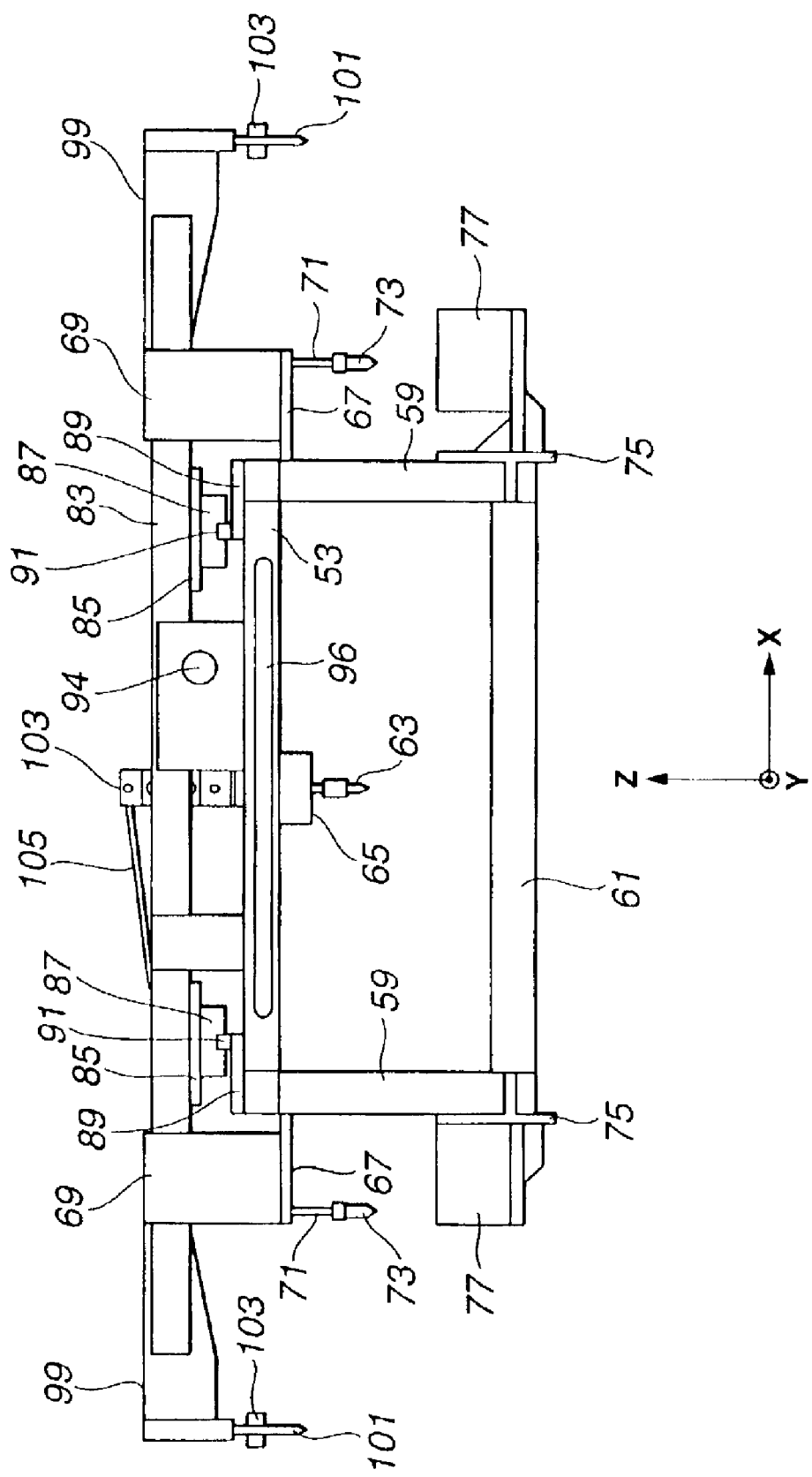
FIG. 5 is an enlarged view taken from the direction of the arrow "V" of FIG. 1.

As is seen from FIGS. 1 and 5, a middle portion of center frame 55 is provided at a lower surface thereof with a block 65 from which a positioning pin 63 projects downward. Positioning pin 63 is to be mated with the above-mentioned positioning opening 29a (see FIG. 2) of radiator core upper member 29 of front end module 21.

Each of horizontal side frames 51 is provided with a laterally outwardly projected holding plate 67 at a position near center frame 55. Each holding plate 67 mounts thereon an air cylinder device housed in a cylinder cover 69.

Figure 3:
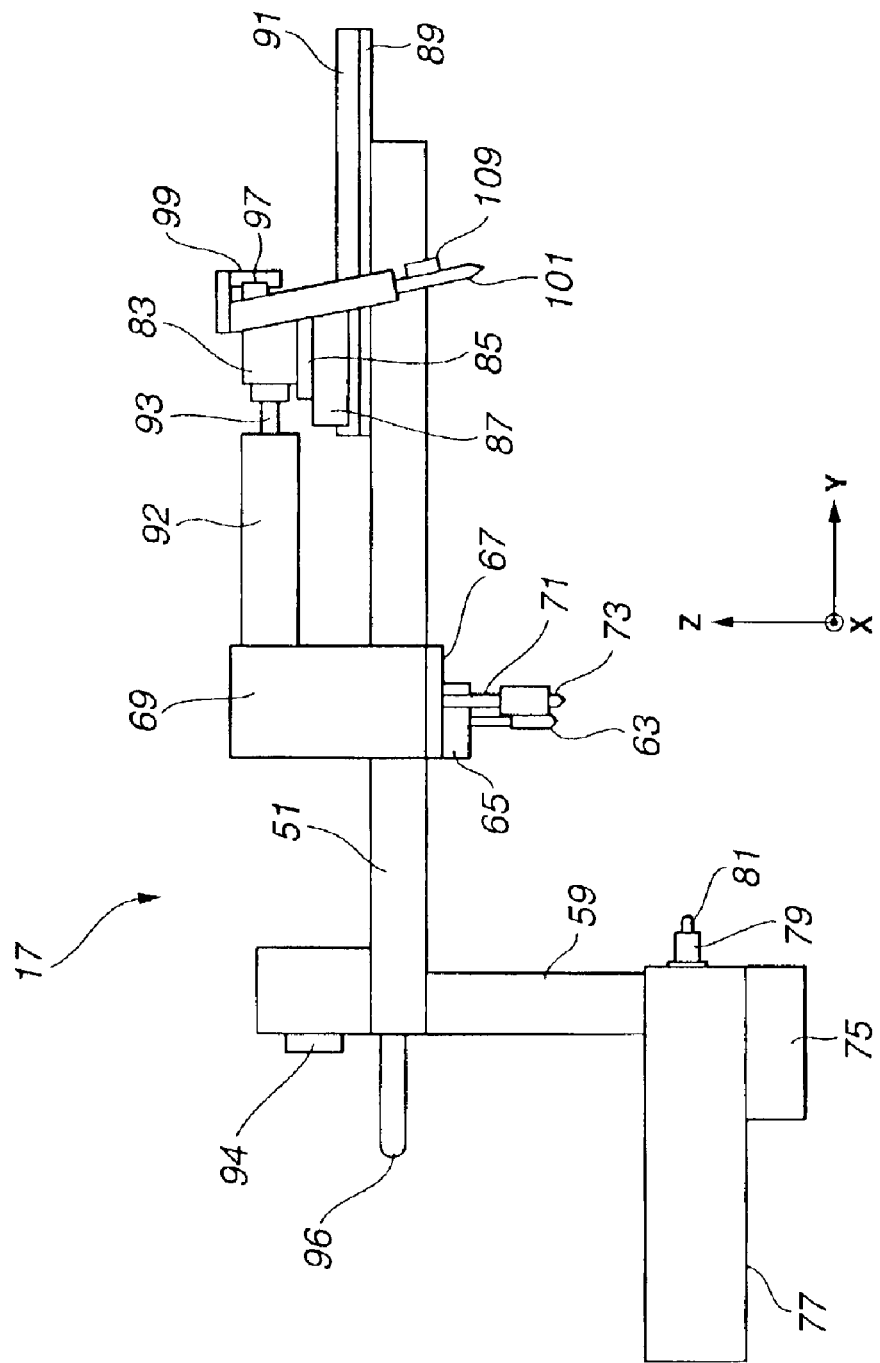
FIG. 3 is an enlarged view taken from the direction of the arrow "III" of FIG. 1.
Figure 4:
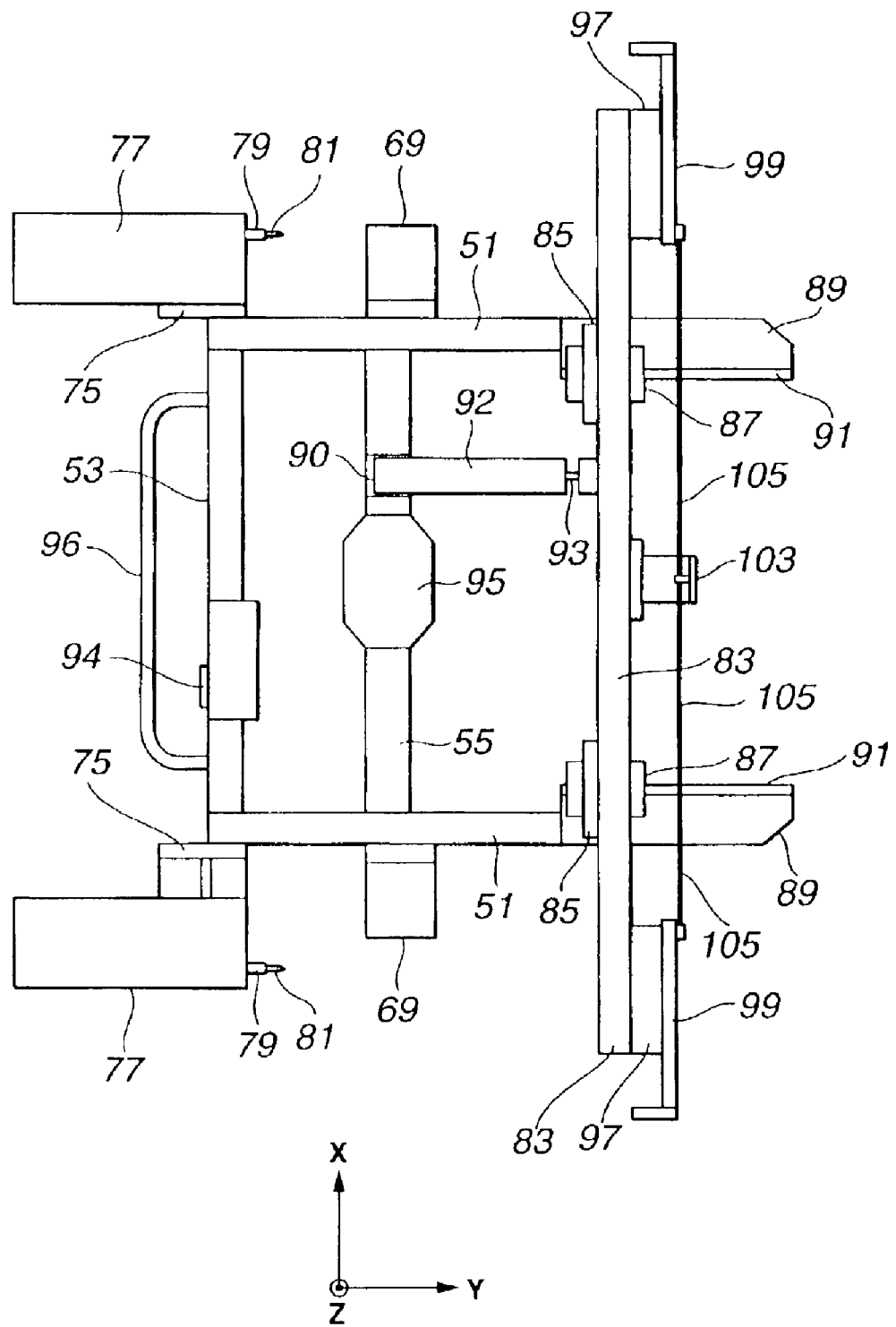
FIG. 4 is a plan view of the part mounting jig.

As is seen from FIG. 3, a piston rod 71 of each air cylinder device projects downward through corresponding holding plate 67 and has at a leading end a pin 73. Thus, pins 73 are vertically movable upon operation of the air cylinder devices. The pins 73 of piston rods 71 of the two air cylinders are to be mated or engaged with the above-mentioned positioning openings 29b (see FIG. 2) of radiator core upper member 29 of front end module 21.

Referring back to FIG. 1, each of pillar frames 59 is provided at a lower end thereof with a holding bracket 75 by which an air cylinder housed in cylinder cover 77 is held.

As is seen from FIG. 3, a piston rod 79 of each air cylinder has at its leading end a locating pin 81. Thus, locating pins 81 are horizontally movable. The locating pins 81 of piston rods 79 of the two air cylinders are to be mated or engaged with the above-mentioned positioning openings 35a (see FIG. 2) of the two side pillar portions 35 of frond end module 21.

Referring back to FIG. 1, on rear end portions of horizontal side frames 51, there is movably disposed a positioning bar 83 which extends laterally outward. That is, positioning bar 83 is movable in the direction of Y. For this movable arrangement, a slider mechanism is used. The slider mechanism comprises two guide rails 91 which are secured through respective holding plates 89 to the rear end portions of horizontal side frames 51 in manner to extend therealong, and two grooved plates 87 which are secured to spaced portions of positioning bar 83 through respective holding blocks 85 and slidably engaged with guide rails 91. That is, the forward/rearward movement of positioning bar 83 relative to horizontal side frames 51 is achieved by sliding the two grooved plates 87 on and along the guide rails 91.

The forward/rearward movement of positioning bar 83 is made by an air cylinder 92 which is held by center frame 55 through a holding bracket 90. That is, a piston rod 93 of air cylinder 92 has a leading end connected to positioning bar 83. Air cylinder 92 is controlled by a control button 94 arranged on front upper frame 53.

Center frame 55 has at a middle portion thereof a mounting plate 95 secured thereto. Although not shown in FIG. 1, an arm member of an assisting device is mounted on mounting plate 95. With the aid of the assisting device, part mounting jig 17 is held on carry truck 15 (see FIG. 15). Although not shown in the drawings, a hydraulically actuated lifter is arranged between jig 17 and carry truck 15, so that the height of jig 17 relative to carry truck 15 is variable. A handling bar 96 is secured to front upper frame 53. That is, when wanting to move the part mounting jig 17 (more specifically, part mounting device) to a desired position together with carry truck 15, an operator (not shown) grips handling bar 96 and pushes or pulls the same.

As is understood from FIGS. 1 and 3, positioning bar 83 is equipped at both ends thereof with respective guide rails 97. These guide rails 97 are operatively engaged with grooved sliders 99 respectively, so that sliders 99 are movable in the direction of X. Each slider 99 is provided at a leading end thereof with a downwardly extending positioning pin 101. As is best seen from FIG. 3, each positioning pin 101 is inclined. Each positioning pin 101 is equipped with a stopper block 109 for the purpose which will become apparent hereinafter.

Referring back to FIG. 1, to a rear surface of positioning bar 83, there is pivotally connected a rotatable link 103. Rotatable link 103 has both ends pivotally connected to respective connecting links 105 which extend to and are pivotally connected to respective sliders 99. Thus, when rotatable link 103 is turned about its center rotation axis 106 (see FIG. 6), two sliders 99 are moved in the directions of X relative to positioning bar 83. That is, a distance between two positioning pins 101 on sliders 99 is varied by turning rotatable link 103.

Figure 6:
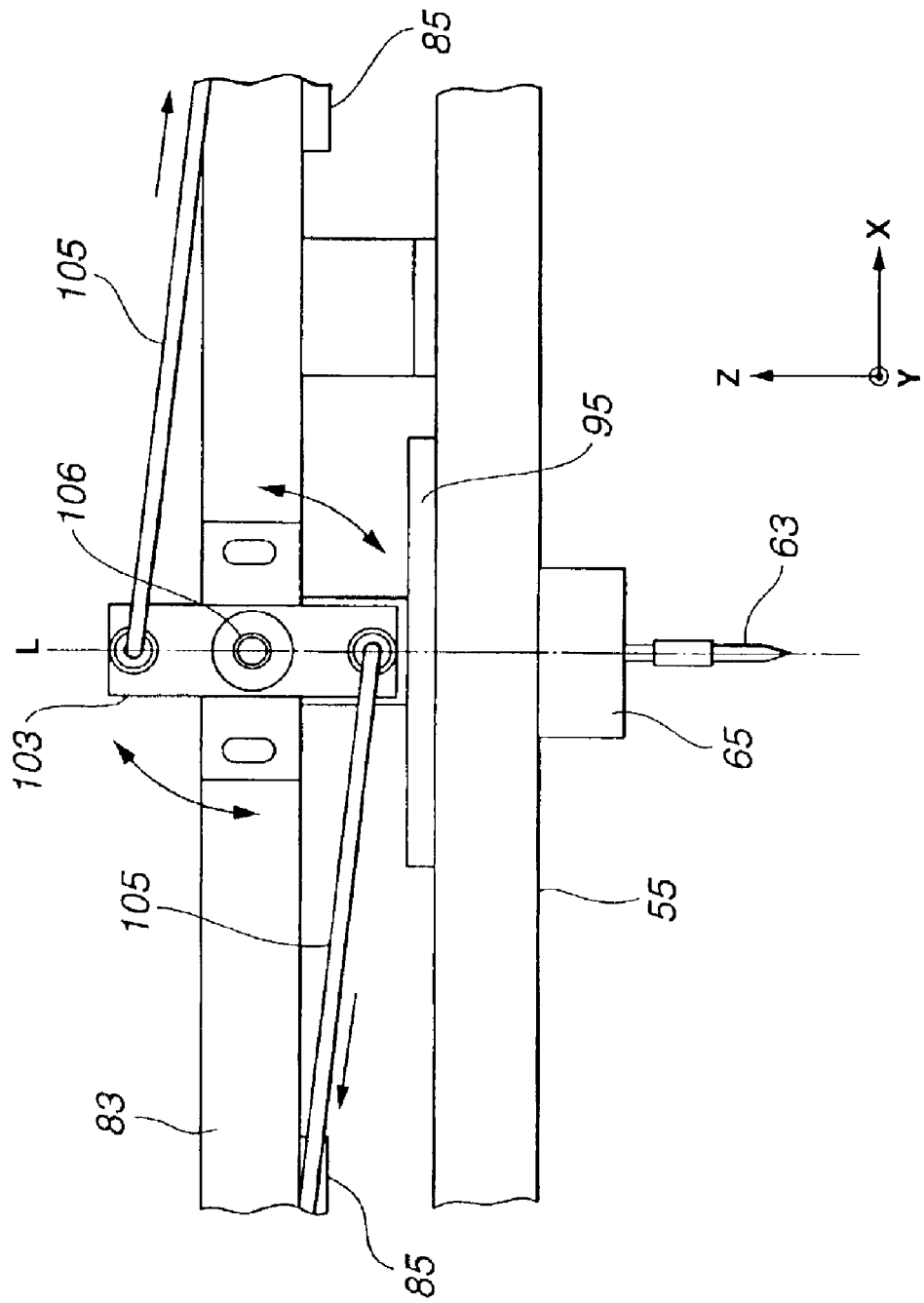
FIG. 6 is an enlarged view of an area indicated by the arrow "VI" of FIG. 1.

As is seen from FIG. 6, rotation axis 106 of rotatable link 103 is placed at a center position between two positioning pins 101 and placed in a common imaginary plane "L" that includes an axis of positioning pin 63.

Figure 7:
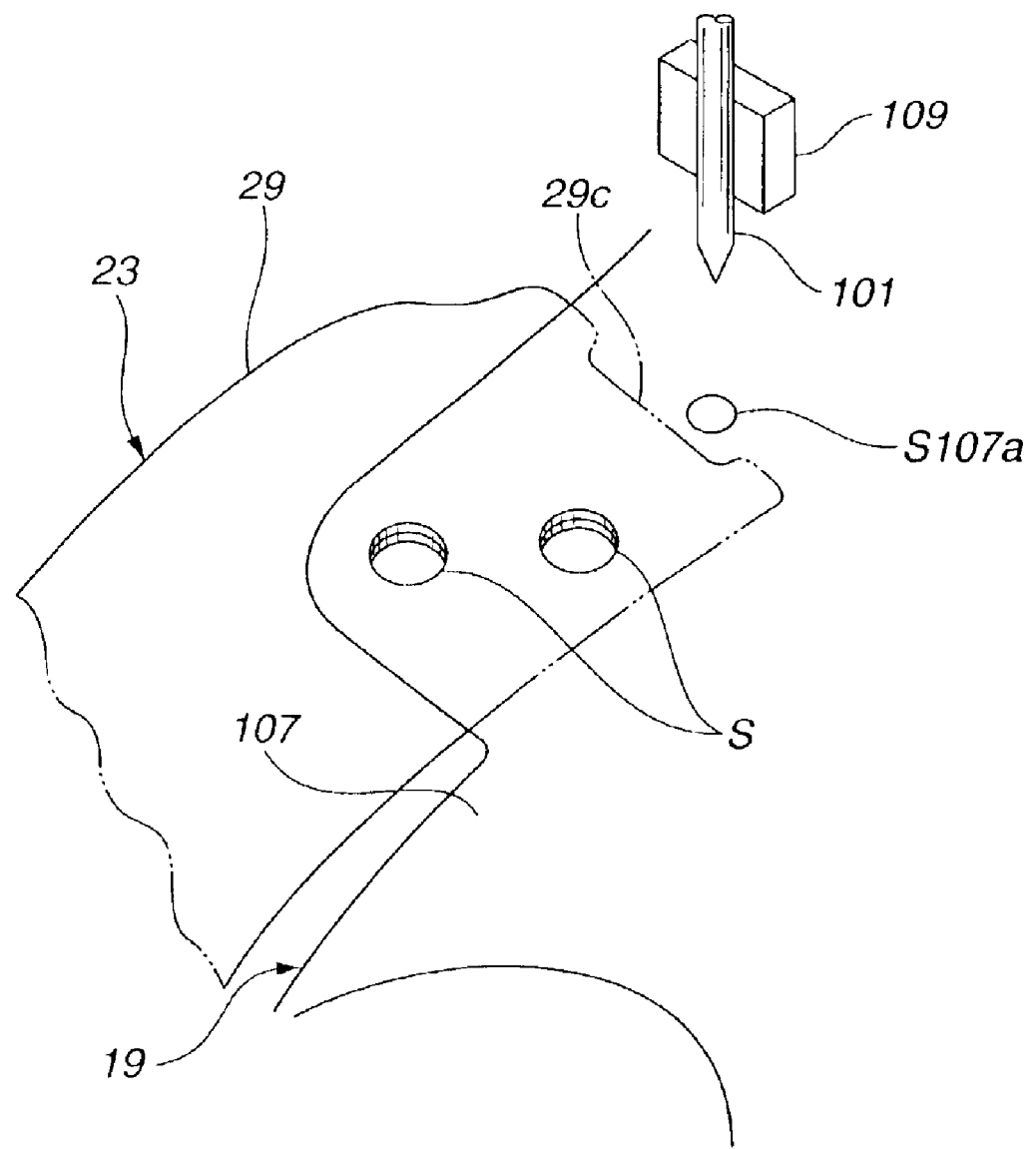
FIG. 7 is a view showing an area where a front end module and a front fender are mated.

Referring to FIG. 7, there is schematically shown a positional relationship between a front fender 107 of vehicle body 12 (see FIG. 12), plastic radiator core support 23 of front end module 21 and positioning pin 101 of part mounting jig 17, which is established when front end module 21 is about to be mounted onto the front end of vehicle body 12. Denoted by numeral 107a is a positioning opening formed in front fender 107. As is seen from the drawing, positioning pin 101 is inserted into positioning opening 107a to establish a positioning between front end module 21 on part mounting jig 17 and front fender 107. Stopper block 109 secured to positioning pin 101 functions to suppress excessive insertion of positioning pin 101 into positioning opening 107a. That is, when positioning pin 101 is properly inserted into positioning opening 107a of front fender 107, the corresponding positional reference recess 29c of radiator core upper member 29 of radiator core support 23 becomes engaged with positioning pin 101 thereby to establish positioning of radiator core support 23 relative to front fender 107 in a fore-and-aft direction of vehicle body 12.

In the following, steps for mounting front end module 21 onto the front end of vehicle body 19 by using the above-mentioned part mounting jig 17 on carry truck (15) will be described in detail with the aid of the drawings, particularly FIGS. 1 and 2.

For ease of understanding, description will be commenced with respect to a start condition wherein part mounting jig 17 has no front end module 21 carried thereon and one front end module 21 is placed between part mounting jig 17 and vehicle body 12.

First, by pushing or pulling handling bar 96 (see FIG. 1), part mounting jig 17 is moved toward front end module 21 and stopped at a position where center frame 55 of jig 17 is positioned just above radiator core upper member 29 of module 21.

Then, by operating the lifter between the part mounting jig 17 and carry truck (15), part mounting jig 17 is moved down inducing engagement of positioning pin 63 with positioning or centering opening 29a (see FIG. 2) of radiator core upper member 29 of front end module 21. Positioning pin 63 serves as a reference pin to all of the other positioning pins of part mounting jig 17, such as vertically movable pins 73, horizontally movable locating pins 81 and inclined positioning pins 101. Thus, once positioning pin 63 is engaged with positioning opening 29a, the positioning between the other positioning pins 73 and 81 and their corresponding positioning openings 29b and 35a of front end module 21 is automatically made. That is, once positioning pin 63 is engaged with positioning opening 29a, the lateral positioning of front end module 21 (viz., the positioning in the directions of X) relative to part mounting jig 17 is established.

Then, by operating the corresponding air cylinders in cylinder covers 69, vertically movable pins 73 (see FIG. 1) are projected downward and inserted into positioning openings 29b (see FIG. 2) of radiator core upper member 29 of front end module 21. Due to engagement of pins 73 with openings 29b, undesired deformation of radiator core support 23, which would occur during subsequent transportation of front end module 21 toward the front end of the vehicle body, is prevented.

Then, by operating the corresponding air cylinders housed in cylinder covers 77, horizontally movable locating pins 81 (see FIG. 1) are projected and inserted into positioning openings 35a (see FIG. 2) of two side pillar portions 35 of radiator core support 23 of front end module 21. Due to engagement of horizontally movable locating pins 81 with positioning openings 35a, the entire weight of front end module 21 is substantially supported by part mounting jig 17, and vertical positioning between front end module 21 and part mounting jig 17 is established.

Figure 8:
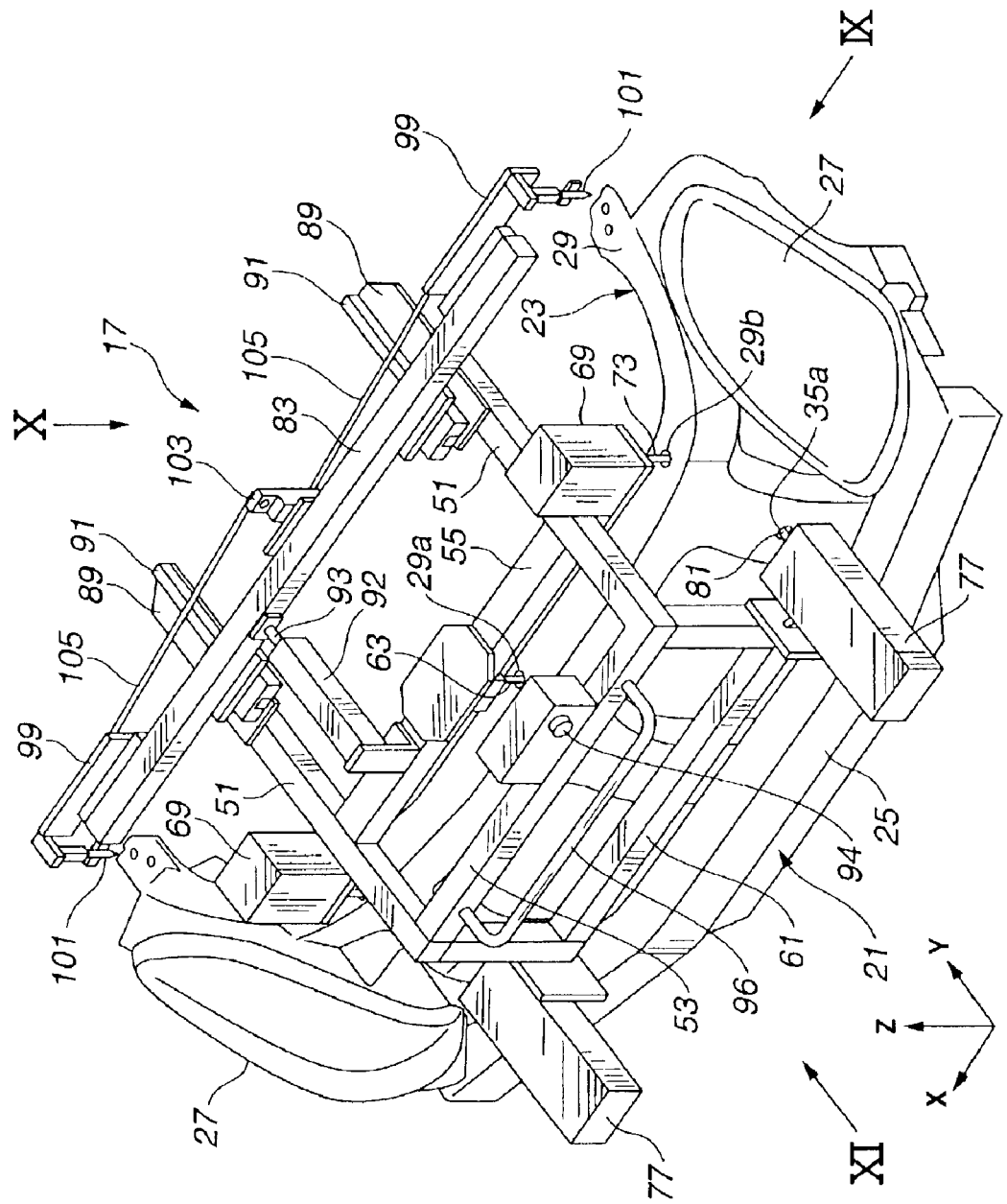
FIG. 8 is a perspective view of the part mounting jig which actually holds the front end module.
Figure 9:
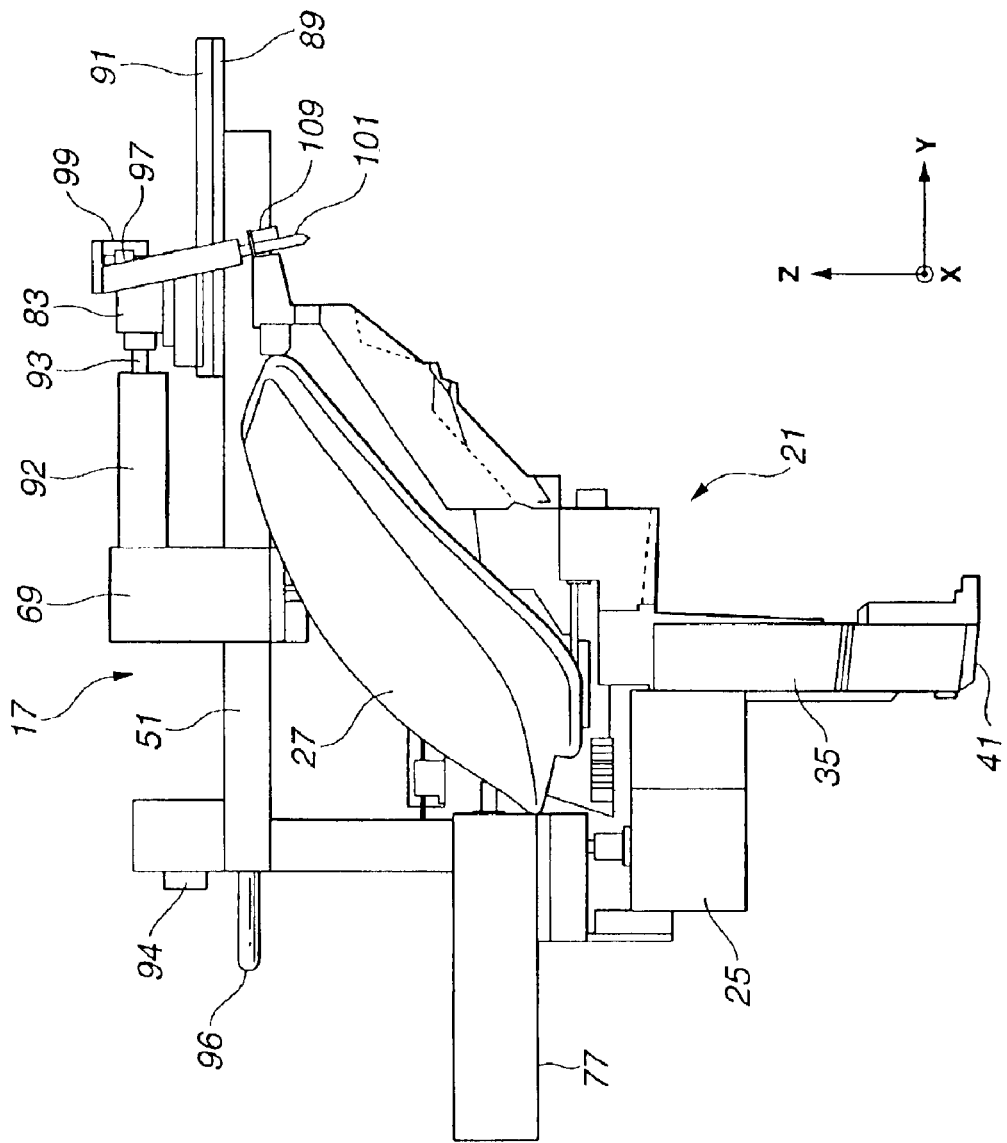
FIG. 9 is a view taken from the direction of the arrow "IX" of FIG. 8.
Figure 10:
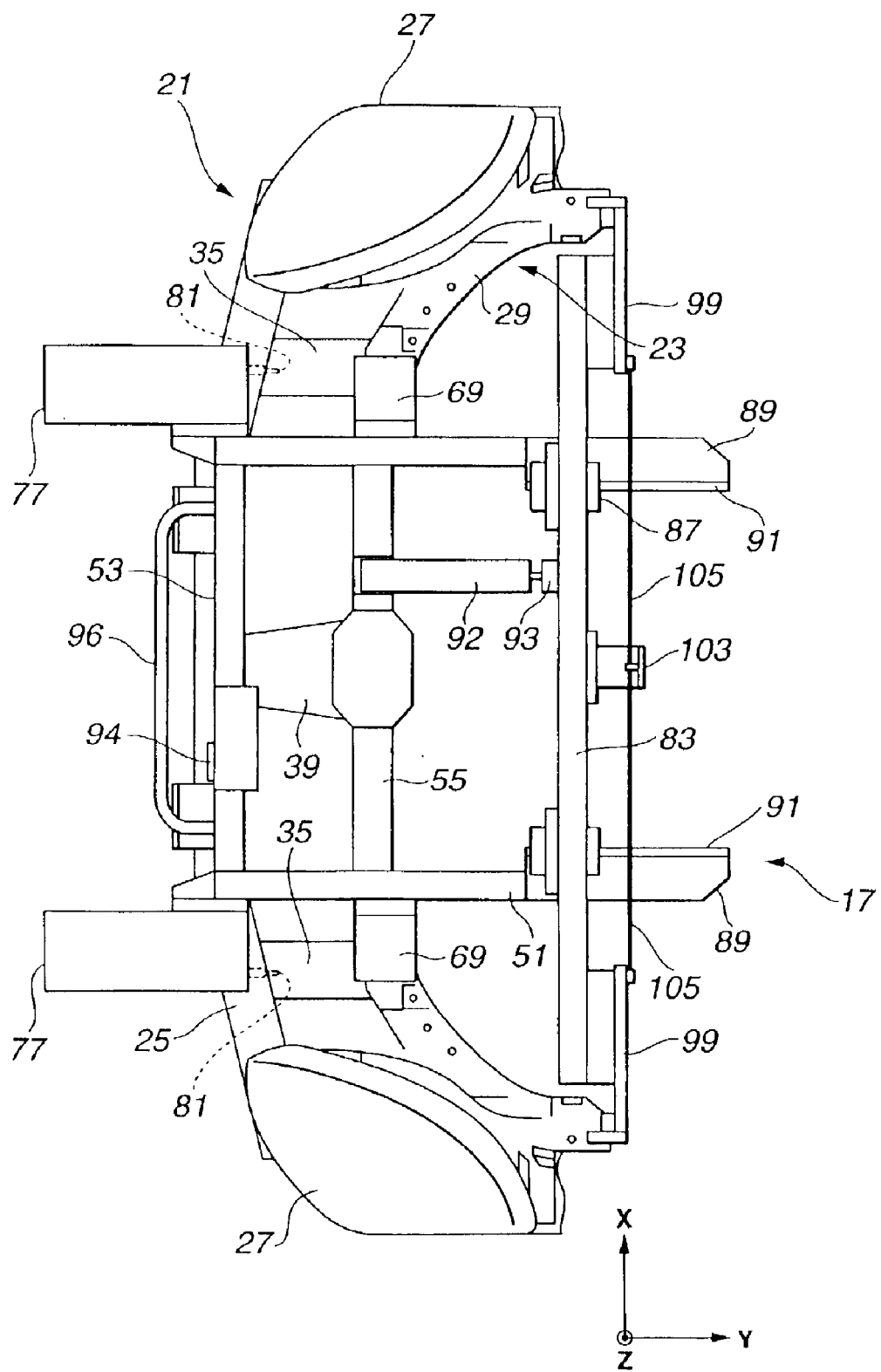
FIG. 10 is a view taken from the direction of the arrow "X" of FIG. 8.

That is, under this condition, front end module 21 is properly held by part mounting jig 17, as is seen from FIG. 8. As is seen from this drawing, inclined positioning pins 101 held by positioning bar 83 are placed near but above the lateral ends of radiator core upper member 29 where positional reference recesses 29c are provided. It is to be noted that FIGS. 9, 10 and 11 are views taken from the directions of arrows "IX", "X" and "XI" of FIG. 8, respectively.

Then, by pushing or manipulating handling bar 96 (see FIG. 8), part mounting jig 17 is moved toward the front end of vehicle body 12 together with front end module 21 held thereon. During this movement, part mounting jig 17 and thus front end module 21 are lifted by a given distance due to work of the hydraulically actuated lifter arranged between jig 17 and carry truck 15, and at the same time, positioning bar 83 is slightly moved rightward in FIG. 8 by the work of air cylinder 92.

Due to these steps, part mounting jig 17 is brought to a certain position where respective inclined positioning pins 101 of jig 17 are positioned just above positioning openings 107a of front fenders 107 of vehicle body 19, as will be seen from FIG. 12.

Then, part mounting jig 17 and thus front end module 21 are moved downward due to work of the hydraulically actuated lifter, so that inclined positioning pins 101 of jig 17 are inserted into positioning openings 107a of front fenders 107. If the positioning between positioning pins 101 and positioning openings 107a is not properly made due to unavoidable dimensional errors of the vehicle body 19, turning the rotatable link 103 by a suitable angle brings about the proper positioning. Because, under this condition, positioning bar 83 takes a distant position relative to jig 17, head lamps 27 (more specifically, head lamp receiving portions 31) of radiator core support 23 are kept away from front fenders 107 thereby avoiding undesired interference therebetween.

As has been mentioned hereinabove, the rotation axis 106 of rotatable link 103 located in a center position between two positioning pins 101 and the axis of positioning pin 63 inserted into positioning opening 29a of radiator core upper member 29 are placed on the common imaginary plane "L", as is seen from FIG. 6. Thus, when the part mounting jig 17 takes the position of FIG. 12 having positioning pins 101 engaged with positioning openings 107a of front fenders 107, the positioning between head lamps 27 of front end module 21 on the part mounting jig 17 and front fenders 107 of vehicle body 19 becomes established with a certain distance kept therebetween.

Figure 13:
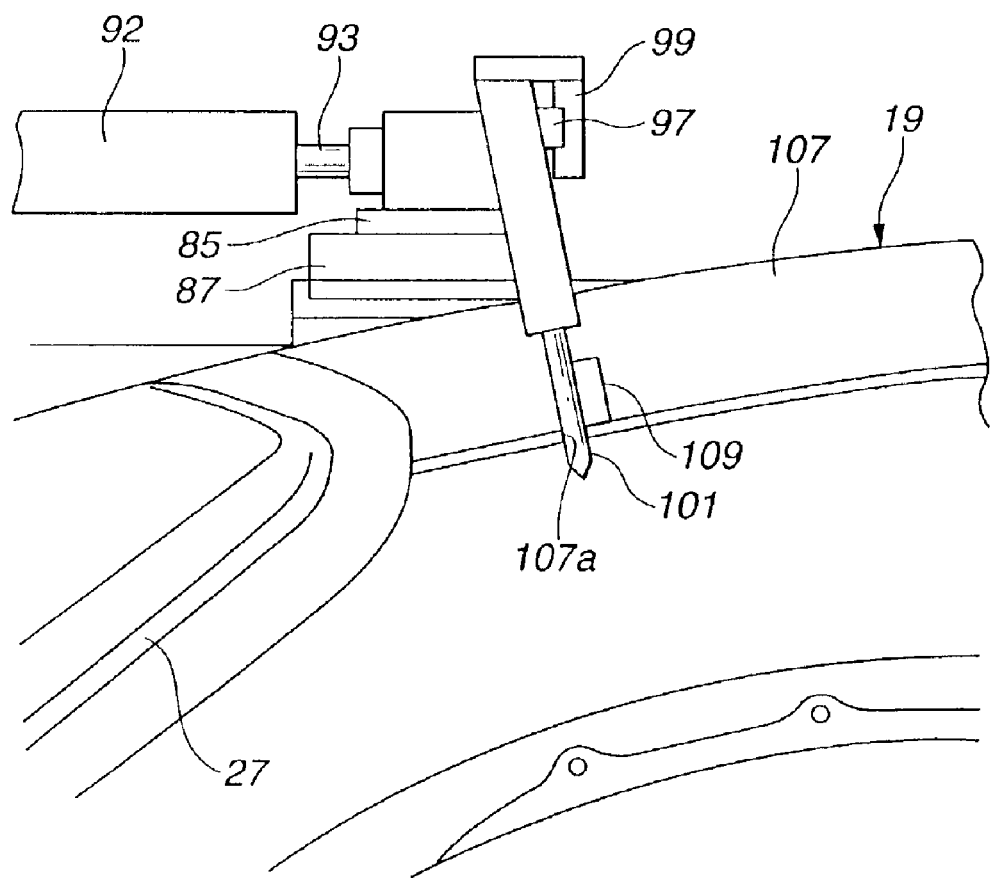
FIG. 13 is an enlarged view showing a state wherein a positioning pin is engaged with a positioning opening of the front fender.

As is seen from FIG. 13, once positioning pins 101 are properly engaged with positioning openings 107a, stopper blocks 109 secured to positioning pins 101 are brought into contact with upper surfaces of front fenders 107. Thus, vertical positioning of front end module 21 relative to vehicle body 19 is established. That is, under this condition, front end module 21 is exactly positioned in the directions of "X" and "Z" relative to vehicle body 19, as is seen from FIG. 12.

Figure 14:
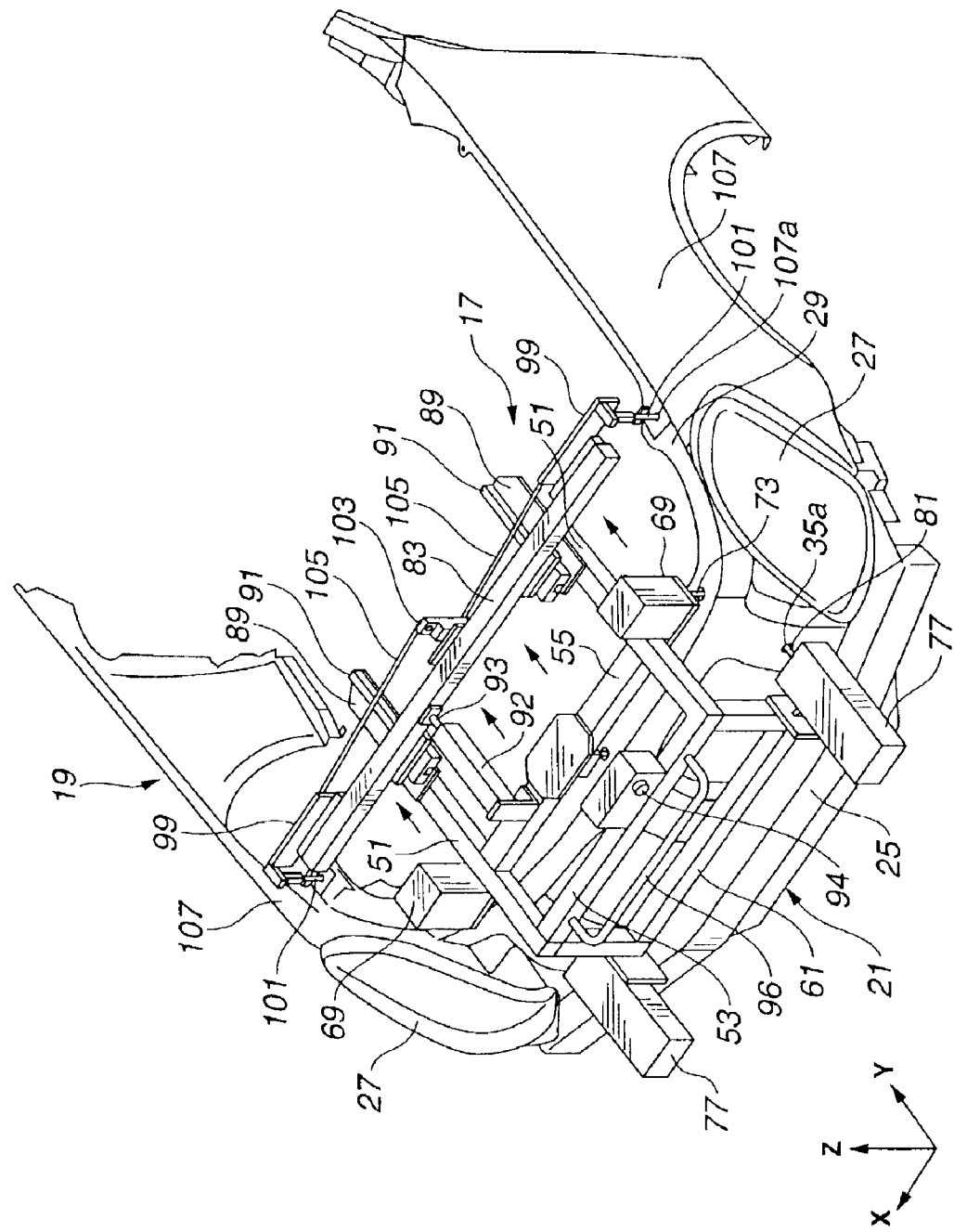
FIG. 14 is a view similar to FIG. 12, but showing a condition wherein the part mounting jig is somewhat shifted toward the vehicle body.

Then, control button 94 on part mounting jig 17 is manipulated. With this, piston rod 93 is drawn into air cylinder 92 moving the entire construction of jig 17 toward vehicle body 19 while making positioning pins 101 engaged with opening openings 107a serve as a base point. Of course, during this movement, grooved plates 87 secured to positioning bar 83 slide on and along guide rails 91 secured to horizontal side frames 51 of part mounting jig 17. When part mounting jig 17 is thus brought to a certain position where positional reference recesses 29c of radiator core upper member 29 abut against respective positioning pins 101 which are kept engaged with positioning openings 107a, movement of jig 17 toward vehicle body 19 is stopped, as is seen from FIG. 14, completing the work for mounting front end module 21 onto the front end of vehicle body 19. As is seen from this drawing, upon completion of the module mounting onto vehicle body 19, positional reference recesses 29c are positioned blow positioning openings 107a of front fenders 107.

Under this condition, part mounting jig 17 shows a fixed state relative to vehicle body 19 because of the engagement of positioning pins 101 with positioning openings 107a. Accordingly, the above-mentioned exact positioning of front end module 21 in the directions of "X" and "Z" relative to vehicle body 19 is kept unchanged, and thus, a desired positioning of head lamps 27 relative to front fenders 107 is obtained avoiding undesired interference therebetween.

Then, as is seen from FIG. 7, radiator core upper member 29 and front fender 107 are secured to each other by means connecting bolts (not shown) or the like at portions indicated by references "S".

Then, horizontally movable locating pins 81 are drawn into corresponding air cylinders disengaging from corresponding positioning openings 35a of the two side pillar portions 35 of front end module 21, and then, part mounting jig 17 is entirely lifted from vehicle body 19 leaving front end module 21 on the front end of vehicle body 19.

Although the foregoing description is directed to part mounting jig 17 used for mounting front end module 21 onto vehicle body 19, the present invention is not limited to such jig. That is, the present invention is applicable to a jig that is used for mounting other module onto the vehicle body.

The entire contents of Japanese Patent Application 2001-224921 filed Jul. 25, 2001 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A device for mounting a shaped part onto a given portion of a base structure, comprising:
    a first structure which is movable relative to said base structure and has a holding device which is capable of holding said shaped part when operated;
    a second structure which is slidably disposed on said first structure and has a positioning device which is capable of establishing a positioning of said first structure relative to said base structure when operated; and
    a position adjusting mechanism incorporated with said positioning device for adjusting an operation of said positionina device, so that said shaped part held by said holding device becomes positioned relative to said base structure when said holding device and said positioning device are both operated,
    wherein when, with said shaped part being positioned relative to said base structure, said second structure is slid on said first structure in a given direction, said first structure is moved toward said positioning device while carrying said shaped part by said holding device to a given position of said base structure.

2. A device as claimed in claim 1, in which said base structure is a vehicle body and said shaped part is a front end module which is to be mounted on a front end of the vehicle body.

3. A device as claimed in claim 2, in which said positioning device comprises a pair of positioning pins which are movable downward to engage with a pair of positioning openings formed in front fenders of said vehicle body, and in which said position adjusting mechanism comprises a link mechanism which, with said positioning pins being in engagement with said pair of positioning openings, moves said front end module held by said holding device toward a position to establish a positioning of said front end module relative to said vehicle body with the aid of the positioning device when operated.

4. A device as claimed in claim 3, in which said positioning pins are so arranged and positioned as to contact a given portion of said front end module when said front end module is brought to said front end of the vehicle body to be mounted on said front end.

5. A device as claimed in claim 3, in which said positioning pins are equipped with stopper blocks which are contactable with peripheral portions of said positioning openings to establish a vertical positioning of said front end module relative to said front fenders.

6. A device as claimed in claim 2, in which said holding device comprises:
   upper pins which are vertically movable and respectively engageable with upper openings formed in an upper surface of said front end module; and
   front pins which are horizontally movable and respectively engageable with front openings formed in a front surface of said front end module.

7. A device as claimed in claim 6, in which said upper pins comprise:
   a fixed pin which is secured to said first structure and engageable with a center one of the upper openings of said front end module; and
   vertically movable pins which are held by said first structure and engageable with remaining ones of said upper openings.

8. A device for mounting a front end module onto a front end of a vehicle body, comprising:
   a frame structure that is vertically movably mounted on a carry truck through a lifter;
   a holding device that holds said front end module on said frame structure;
   a positioning bar slidably disposed on said frame structure;
   an actuator that moves said positioning bar on said frame structure when operated;
   positioning pins movably held on both ends of said positioning bar, said positioning pins being engageable with positioning openings formed in said front end of said vehicle body; and
   a link mechanism that varies a distance between said positioning pins when operated.

9. A device as claimed in claim 8, in which said holding mechanism comprises:
   a fixed pin fixed to a given portion of said frame structure, said fixed pin being projected downward and engageable with a centering opening formed in said front end module;
   vertically movable pins held by said frame structure, said vertically movable pins being engaged with first positioning openings formed in said front end module when actuated;
   horizontally movable pins held by said frame structure, said horizontally movable pins being engaged with second positioning openings formed in said front end module when actuated; and
   actuators that actuate said vertically and horizontally movable pins.

10. A device as claimed in claim 8, in which said link mechanism comprises:
    slider structures for permitting sliding movement of said positioning pins on and along said positioning bar;
    a rotatable link pivotally connected to said positioning bar; and
    two connecting links, each having one end pivotally connected to one end of said rotatably link and the other end pivotally connected to corresponding one of said slider structures.

11. A device as claimed in claim 8, in which each of said positioning pins is equipped with a stopper block, said stopper block being brought into contact with a peripheral portion of the corresponding positioning opening of said front end of said vehicle body when the positioning pin is inserted into the corresponding positioning opening by a given degree.

* * * * *